(12) United States Patent
Huang

(10) Patent No.: US 8,579,488 B2
(45) Date of Patent: Nov. 12, 2013

(54) COMPUTER BEZEL WITH LIGHT-GUIDE STRUCTURE

(75) Inventor: Fu-Kuo Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 47 days.

(21) Appl. No.: 13/462,884

(22) Filed: May 3, 2012

(65) Prior Publication Data

US 2013/0070473 A1    Mar. 21, 2013

(30) Foreign Application Priority Data

Sep. 16, 2011    (TW) .............................. 100133527 A

(51) Int. Cl.
*F21V 7/04*    (2006.01)
(52) U.S. Cl.
USPC .......................................... 362/602; 362/603
(58) Field of Classification Search
USPC .................. 362/603, 602, 97.4, 633
See application file for complete search history.

(56) References Cited

U.S. PATENT DOCUMENTS

| 2008/0192474 A1* | 8/2008 | Chen et al. ..................... 362/277 |
| 2011/0317401 A1* | 12/2011 | Ling et al. ..................... 362/97.2 |
| 2013/0058127 A1* | 3/2013 | Huang .......................... 362/602 |

* cited by examiner

*Primary Examiner* — Evan Dzierzynski
(74) *Attorney, Agent, or Firm* — Altis & Wispro Law Group, Inc.

(57) ABSTRACT

A computer bezel includes a bezel body, a light-guide structure, and a light source. The light-guide structure includes a guiding portion and a lighting portion. The lighting portion defines an outer surface exposed out of the bezel body. The guiding portion includes a first bottom surface and a first end surface. The lighting portion includes an end portion. The end portion defines a first distal surface. The lighting portion defines a second distal surface, a second bottom surface connected between the first distal surface and the second distal surface, a third distal surface, and a connecting surface connected between the third distal surface and the second distal surface. The guiding portion is configured to guide a plurality of light beams emitted from the light source to the lighting portion to enable the light beams to be refracted from the outer surface so as to be visible to a user.

18 Claims, 5 Drawing Sheets

COMPUTER BEZEL WITH LIGHT-GUIDE STRUCTURE

BACKGROUND

1. Technical Field

The present disclosure relates to electronic devices, and particularly to a computer bezel with a light-guide structure.

2. Description of Related Art

Electronic devices may include a panel and a circuit board, and an indicator lamp secured to an outside of the panel. A light source is electronically connected to the circuit board. The indicator lamp and the light source may be arranged in a straight line substantially perpendicular to the circuit board, and light beams from the light source can be directly transmitted to the indicator lamp. However, when the indicator lamp is attached to a different location, the light beams from the light source cannot be completely or efficiently transmitted to the indicator lamp. Thus, a brightness of the indicator lamp is so weak such that the indicator lamp may be nearly invisible. Therefore, an electronic device with an improved light-guide structure is desirable.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
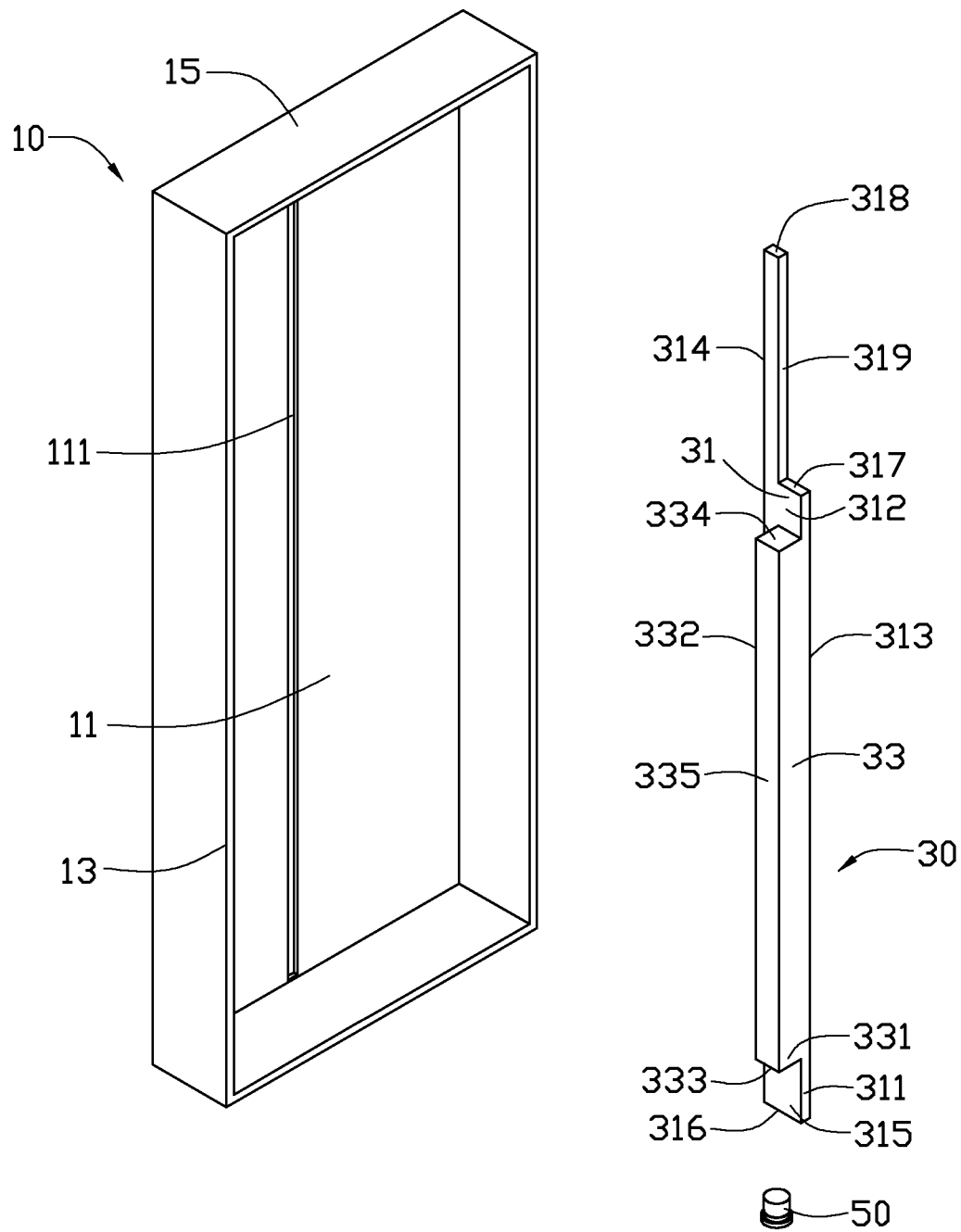
FIG. 1 is an exploded, isometric view of a computer bezel in accordance with an embodiment.

Referring to FIG. 1, a computer bezel in accordance with an embodiment includes a bezel body 10, a light-guide structure 30, and a light source 50. In one embodiment, the light source 50 is a light emitting diode (LED).

The bezel body 10 includes a front panel 11, a top panel 13 extending from the front panel 11 and two side panels 15 extending from the front pane 11. The two side panels 15 are substantially parallel to each other and substantially perpendicular to the top panel 13. The front panel 11 is curved. The front panel 11 defines an elongated opening 111.

The light-guide structure 30 includes a lighting portion 31 and a guiding portion 33 extending from the lighting portion 31. The guiding portion 33 is rectangular. The guiding portion 33 includes a first bottom surface 331, a top surface 332 substantially parallel to the first bottom surface 331, a first end surface 333, a second end surface 334, and a third end surface 335 connected between the first end surface 333 and the second end surface 334. The second end surface 334 is substantially perpendicular to the first bottom surface 331. The lighting portion 31 includes a second bottom surface 311, a first side surface 312 extending from the second bottom surface 311, a second side surface 313 extending from the second bottom surface 311, and an outer surface 314 connected between the first side surface 312 and the second side surface 313. The second side surface 313 is substantially parallel to the first side surface 312. The outer surface 314 is configured to be received in the elongated opening 111. In one embodiment, the outer surface 314 is substantially parallel to the second bottom surface 311. The first bottom surface 331 of the guiding portion 33 and the second bottom surface 311 of the lighting portion 31 are in the same plane. The first bottom surface 331 is substantially perpendicular to the side panel 15. The length of the first bottom surface 331 is less than the length of the second bottom surface 311 in a direction substantially perpendicular to the second end surface 334. The lighting portion 31 includes an end portion 315 adjacent to the first end surface 333 of the guiding portion 33. The first side surface 312 is substantially parallel to the third end surface 335. The end portion 315 includes a first distal surface 316 connected between the first side surface 312 and the second side surface 313. The first distal surface 316 is substantially parallel to the second bottom surface 311. The lighting portion 31 further includes a second distal surface 317 substantially parallel to the first distal surface 316. The second bottom surface 311 is connected between the first distal surface 316 and the second distal surface 317. The lighting portion 31 further includes a third distal surface 318 substantially parallel to the first distal surface 316. The outer surface 314 is connected between the first distal surface 316 and the third distal surface 318. A connecting surface 319 is connected between the second distal surface 317 and the third distal surface 318. The connecting surface 319 is substantially parallel to the second bottom surface 311.

Figure 2:
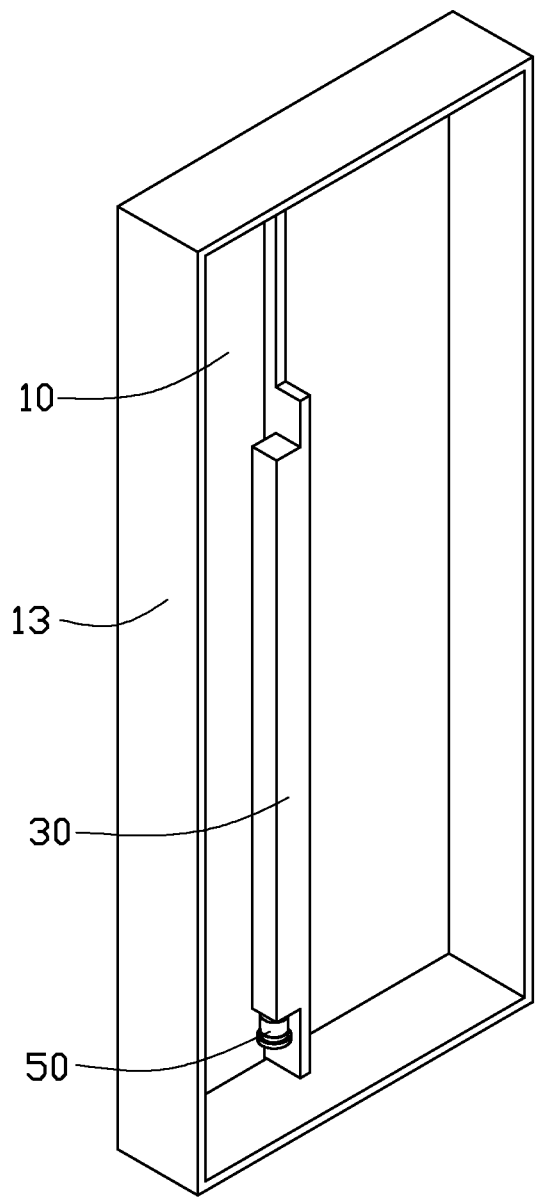
FIG. 2 is an assembled view of the computer bezel of FIG. 1.
Figure 3:
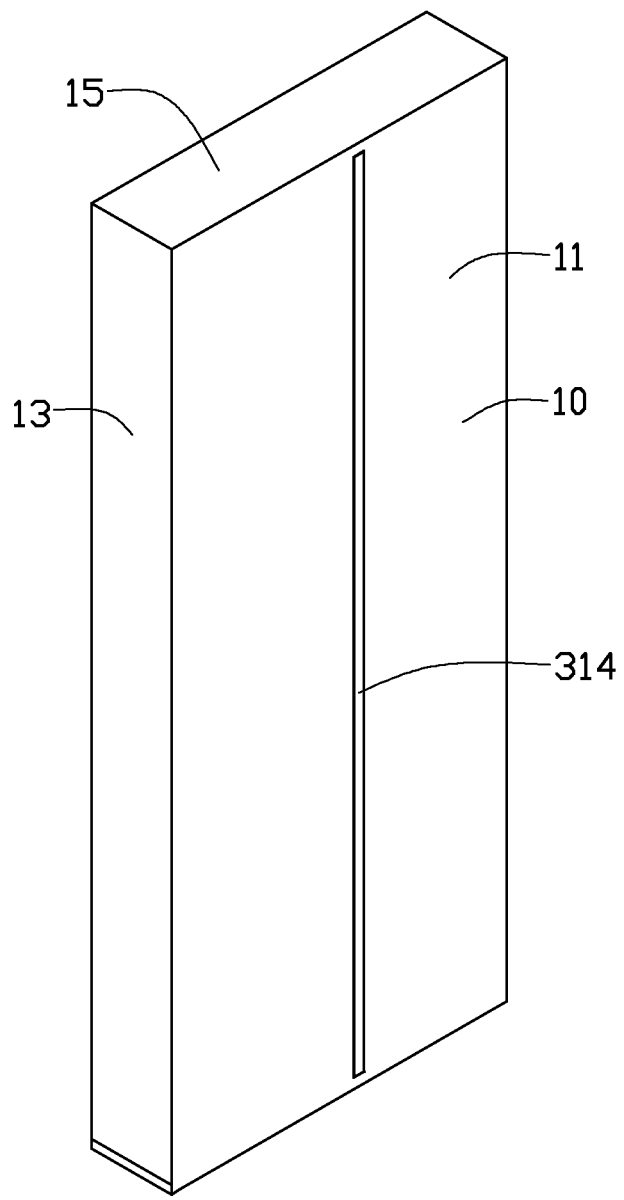
FIG. 3 is similar to FIG. 2, but viewed from another aspect.

Referring to FIGS. 2 and 3, in assembly, the lighting portion 31 of the light-guide structure 30 is received in the elongated opening 111 to enable the outer surface 314 to be exposed out of the bezel body 10. At this time, the guiding portion 33 of the light-guide structure 30 is located on the inner surface of the front panel 11. The light source 50 is mounted on the bezel body 10 and adjacent to the first end surface 333 of the guiding portion 33.

Figure 4:
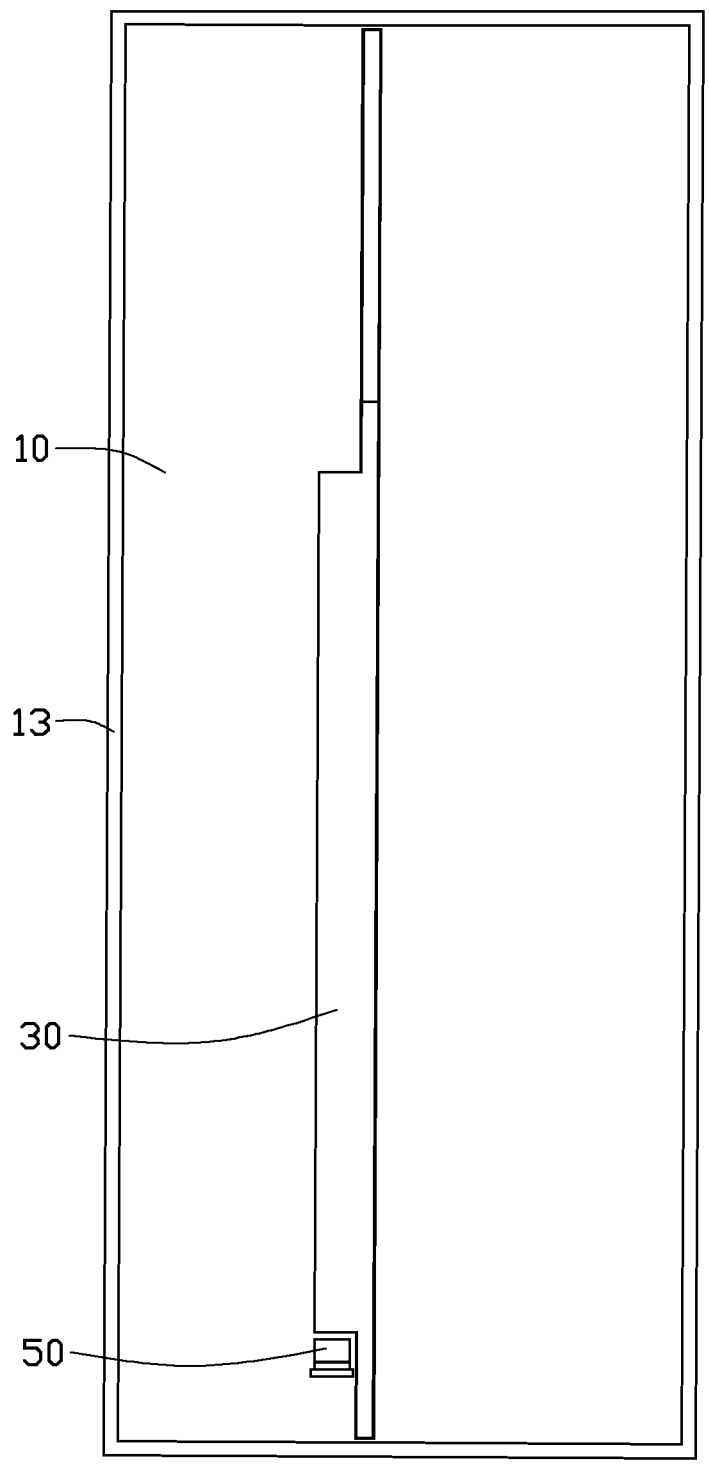
FIG. 4 is similar to FIG. 2, but viewed from another aspect.
Figure 5:
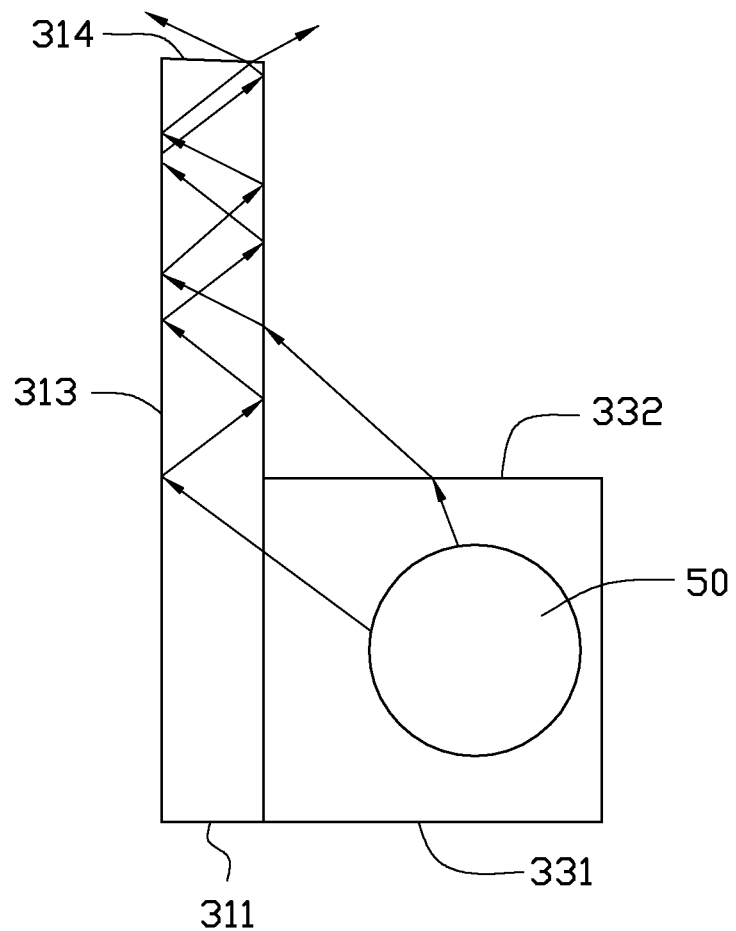
FIG. 5 is a schematic view of the light-guide structure and the light source of FIG. 1 in operation.

Referring to FIGS. 4 and 5, in use, a plurality of light beams are emitted from the light source 50 into the guiding portion 33 via the first end surface 333. A part of light beams is refracted to the top surface 332. A part of light beams are emitted into the lighting portion 31 after being refracted by the top surface 332. Then the light beams are refracted from the outer surface 314. A part of light beams are emitted into the first bottom surface 331 after the reflection from the top surface 332, and are emitted into the top surface 332 after the reflection from the first bottom surface 331. The light beams are emitted into the lighting portion 31 via the top surface 332. A part of light beams are emitted to the second bottom surface 311 after the reflection from the top surface 332. Then the light beams are emitted into the lighting portion 31 and refracted from the outer surface 314 so as to be visible to a user.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A computer bezel comprising:
   a bezel body;
   a light-guide structure mounted to the bezel body, the light-guide structure comprising a guiding portion and a lighting portion extending from the guiding portion; the lighting portion defining an outer surface exposed out of the bezel body; the guiding portion comprising a first bottom surface and a first end surface connected to the first bottom surface; the lighting portion comprising an end portion, the end portion defining a first distal surface; the lighting portion defining a second distal surface, a second bottom surface connected between the first distal surface and the second distal surface, a third distal surface, and a connecting surface connected between the third distal surface and the second distal surface; and
   a light source mounted on the end portion and located between the first end surface and the first distal surface;
   wherein the guiding portion is configured to guide a plurality of light beams emitted from the light source to the lighting portion so that the plurality of light beams are refracted from the outer surface.

2. The computer bezel of claim 1, wherein the first bottom surface and the second bottom surface are in a same plane.

3. The computer bezel of claim 2, wherein the first distal surface is substantially parallel to the second distal surface.

4. The computer bezel of claim 3, wherein the guiding portion further comprises a second end surface; the first bottom surface is connected between the first end surface and the second end surface; and a length of the first bottom surface is less than a length of the second bottom surface in a direction substantially perpendicular to the second end surface.

5. The computer bezel of claim 4, wherein the second end surface is substantially perpendicular to the first bottom surface.

6. The computer bezel of claim 3, wherein the third distal surface is parallel to the second distal surface.

7. The computer bezel of claim 1, wherein the connecting surface is substantially parallel to the second bottom surface.

8. The computer bezel of claim 1, wherein the outer surface is substantially parallel to the second bottom surface.

9. The computer bezel of claim 1, wherein the lighting portion comprises a first side surface and a second side surface; the second bottom surface is connected between the first side surface and the second side surface; the first side surface is connected to the guiding portion; and the outer surface is connected to the first side surface and the second side surface.

10. A computer bezel comprising:
    a bezel body, the bezel body comprising a front panel, the front panel defining an elongated opening;
    a light-guide structure mounted to the bezel body, the light-guide structure comprising a guiding portion and a lighting portion extending from the guiding portion; the lighting portion defining an outer surface; the lighting portion being received in the elongated opening; the outer surface being exposed out of the bezel body; and the guiding portion being located on an inner surface of the bezel body; the guiding portion comprising a first bottom surface and a first end surface connected to the first bottom surface; the lighting portion comprising an end portion, the end portion defining a first distal surface; the lighting portion defining a second distal surface, a second bottom surface connected between the first distal surface and the second distal surface, a third distal surface, and a connecting surface connected between the third distal surface and the second distal surface; and the first end surface substantially parallel to the first distal surface; and
    a light source mounted on the end portion and located between the first end surface and the first distal surface;
    wherein the guiding portion is configured to guide a plurality of light beams emitted from the light source to the lighting portion so that the plurality of light beams are refracted from the outer surface.

11. The computer bezel of claim 10, wherein the first bottom surface and the second bottom surface are in a same plane.

12. The computer bezel of claim 11, wherein the first distal surface is substantially parallel to the second distal surface.

13. The computer bezel of claim 12, wherein the guiding portion further comprises a second end surface; the first bottom surface is connected between the first end surface and the second end surface; and a length of the first bottom surface is less than a length of the second bottom surface in a direction substantially perpendicular to the second end surface.

14. The computer bezel of claim 13, wherein the second end surface is substantially perpendicular to the first bottom surface.

15. The computer bezel of claim 12, wherein the third distal surface is parallel to the second distal surface.

16. The computer bezel of claim 10, wherein the connecting surface is substantially parallel to the second bottom surface.

17. The computer bezel of claim 10, wherein the outer surface is substantially parallel to the second bottom surface.

18. The computer bezel of claim 10, wherein the lighting portion comprises a first side surface and a second side surface; the second bottom surface is connected between the first side surface and the second side surface; the first side surface is connected to the guiding portion; and the outer surface is connected to the first side surface and the second side surface.

* * * * *